(12) United States Patent
Hudson et al.

(10) Patent No.: US 8,490,760 B2
(45) Date of Patent: Jul. 23, 2013

(54) BRAKE COOLING FLUID DIVERTER FOR AN OFF-HIGHWAY MACHINE

(75) Inventors: Michael D. Hudson, Mount Zion, IL (US); Cameron T. Lane, Decatur, IL (US); Joseph E. Tabor, Eureka, IL (US); Keith Kabrick, Springfield, IL (US); Michael D. Staub, Metamora, IL (US); Tom N. Brooks, Oakley, IL (US); William J. Tate, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/494,191

(22) Filed: Jun. 12, 2012

(65) Prior Publication Data

US 2012/0247887 A1 Oct. 4, 2012

Related U.S. Application Data

(63) Continuation of application No. 12/201,906, filed on Aug. 29, 2008, now Pat. No. 8,281,908.

(51) Int. Cl.
*F16D 65/78* (2006.01)

(52) U.S. Cl.
USPC .................................. 188/264 F; 188/264 P

(58) Field of Classification Search
USPC ................... 188/264 R, 264 D, 264 E, 264 F, 188/264 CC, 264 P; 303/10; 701/48
See application file for complete search history.

(56) References Cited

U.S. PATENT DOCUMENTS

| | | | |
|---|---|---|---|
| 2,279,407 A | 8/1942 | McCune | |
| 2,409,099 A | 10/1946 | Bloomfield | |
| 2,482,840 A | 9/1949 | Collins et al. | |
| 2,520,204 A | 8/1950 | Hancock | |
| 2,784,728 A * | 3/1957 | Bathurst et al. | 137/47 |
| 2,832,428 A * | 4/1958 | Kelley et al. | 180/54.1 |
| 2,832,429 A * | 4/1958 | Kelley et al. | 180/54.1 |
| 2,917,137 A * | 12/1959 | Kelley | 188/264 E |
| 2,930,456 A * | 3/1960 | Sanford et al. | 188/358 |
| 2,944,618 A | 7/1960 | Schjolin | |
| 2,945,566 A * | 7/1960 | Eames et al. | 188/264 F |
| 2,976,965 A * | 3/1961 | Schjolin | 188/264 D |
| 3,216,769 A * | 11/1965 | Hicks et al. | 303/6.01 |
| 3,259,216 A | 7/1966 | Klaus et al. | |
| 3,410,375 A | 11/1968 | Schmidt | |
| 3,423,134 A * | 1/1969 | Knapp | 303/2 |
| 3,495,404 A | 2/1970 | Thompson | |
| 3,562,565 A | 2/1971 | Higashino | |
| 3,670,854 A | 6/1972 | Maci | |
| 3,696,893 A * | 10/1972 | Koivunen | 188/264 E |
| 3,727,730 A * | 4/1973 | Bianchetta et al. | 477/203 |
| 3,730,596 A * | 5/1973 | Felix et al. | 303/3 |

(Continued)

FOREIGN PATENT DOCUMENTS

JP 2-11454 A 1/1990

*Primary Examiner* — Christopher Schwartz

(74) *Attorney, Agent, or Firm* — Leydig, Voit, Mayer

(57) ABSTRACT

The disclosure relates, in one aspect, to a friction brake cooling system for a machine. The cooling system includes at least one pump connected to at least one reservoir containing cooling fluid. A controller is configured to divert a cooling fluid flow through a valve to a first friction brake system and to a second friction brake system based on the use of the systems. In another aspect, the disclosure relates to a method of cooling a first friction brake system and a second friction brake system including diverting a flow of brake cooling fluid to the systems based on the use of the systems.

12 Claims, 5 Drawing Sheets

U.S. PATENT DOCUMENTS

| | | |
|---|---|---|
| 3,774,095 A | 11/1973 | Coccia |
| 3,944,287 A | 3/1976 | Nagase |
| 3,949,844 A * | 4/1976 | Larson et al. .............. 188/264 P |
| 3,957,315 A * | 5/1976 | Cummins et al. ............ 303/9.76 |
| 3,992,062 A | 11/1976 | Jeffrey et al. |
| 4,083,469 A * | 4/1978 | Schexnayder ................. 414/509 |
| 4,181,366 A | 1/1980 | Dobner |
| 4,270,806 A | 6/1981 | Venkataperumal et al. |
| 4,280,073 A | 7/1981 | Miller |
| 4,313,517 A | 2/1982 | Pivar |
| 4,495,449 A | 1/1985 | Black et al. |
| 4,651,071 A * | 3/1987 | Imanaka ....................... 318/371 |
| 4,659,149 A | 4/1987 | Rumsey et al. |
| 4,671,577 A | 6/1987 | Woods |
| 4,698,561 A | 10/1987 | Buchanan et al. |
| 4,938,321 A | 7/1990 | Kelley et al. |
| 4,962,969 A | 10/1990 | Davis |
| 5,139,121 A | 8/1992 | Kumura et al. |
| 5,222,787 A | 6/1993 | Eddy et al. |
| 5,293,966 A | 3/1994 | Chareire |
| 5,302,008 A | 4/1994 | Miyake et al. |
| 5,322,147 A | 6/1994 | Clemens |
| 5,355,978 A | 10/1994 | Price et al. |
| 5,362,135 A | 11/1994 | Riddiford et al. |
| 5,378,053 A | 1/1995 | Patient et al. |
| 5,450,324 A | 9/1995 | Cikanek |
| 5,469,943 A | 11/1995 | Hill et al. |
| 5,472,264 A | 12/1995 | Klein et al. |
| 5,476,310 A | 12/1995 | Ohtsu et al. |
| 5,492,192 A | 2/1996 | Brooks et al. |
| 5,511,859 A | 4/1996 | Kade et al. |
| 5,539,641 A | 7/1996 | Littlejohn |
| 5,551,764 A | 9/1996 | Kircher et al. |
| 5,573,312 A | 11/1996 | Müller et al. |
| 5,615,933 A | 4/1997 | Kidston et al. |
| 5,632,534 A | 5/1997 | Knechtges |
| 5,707,115 A | 1/1998 | Bodie et al. |
| 5,755,302 A | 5/1998 | Lutz et al. |
| 5,769,509 A | 6/1998 | Feigel et al. |
| 5,775,784 A | 7/1998 | Koga et al. |
| 5,839,800 A | 11/1998 | Koga et al. |
| 5,853,229 A | 12/1998 | Willmann et al. |
| 5,951,115 A | 9/1999 | Sakai et al. |
| 5,961,190 A * | 10/1999 | Brandmeier et al. ......... 303/152 |
| 5,962,997 A | 10/1999 | Maisch |
| 5,983,149 A | 11/1999 | Tate et al. |
| 6,030,314 A | 2/2000 | Brooks et al. |
| 6,076,899 A | 6/2000 | Isella |
| 6,120,115 A | 9/2000 | Manabe |
| 6,158,822 A | 12/2000 | Shirai et al. |
| 6,213,567 B1 | 4/2001 | Zittlau et al. |
| 6,226,586 B1 | 5/2001 | Luckevich et al. |
| 6,231,134 B1 | 5/2001 | Fukasawa et al. |
| 6,318,487 B2 | 11/2001 | Yanase et al. |
| 6,325,470 B1 | 12/2001 | Schneider |
| 6,425,643 B2 | 7/2002 | Shirai et al. |
| 6,441,573 B1 | 8/2002 | Zuber et al. |
| 6,456,909 B1 | 9/2002 | Shimada et al. |
| 6,457,784 B1 | 10/2002 | Böhm et al. |
| 6,488,344 B2 | 12/2002 | Huls et al. |
| 6,547,343 B1 | 4/2003 | Hac |
| 6,560,515 B2 | 5/2003 | Inoue |
| 6,663,197 B2 | 12/2003 | Joyce |
| 6,687,593 B1 | 2/2004 | Crombez et al. |
| 6,709,075 B1 | 3/2004 | Crombez et al. |
| 6,724,165 B2 | 4/2004 | Hughes |
| 6,910,747 B2 | 6/2005 | Tsunehara |
| 6,959,971 B2 | 11/2005 | Tsunehara |
| 7,029,077 B2 | 4/2006 | Anwar et al. |
| 7,036,640 B2 * | 5/2006 | Spielman ................... 188/264 P |
| 7,059,691 B2 | 6/2006 | Tsunehara et al. |
| 7,104,617 B2 | 9/2006 | Brown |
| 7,136,737 B2 | 11/2006 | Ashizawa et al. |
| 7,290,840 B2 | 11/2007 | Tsunehara et al. |
| 7,308,352 B2 | 12/2007 | Wang et al. |
| 7,311,163 B2 | 12/2007 | Oliver |
| 7,448,697 B2 * | 11/2008 | Brancolini ................... 303/9.61 |
| 7,513,343 B2 * | 4/2009 | Catalano .................... 188/264 P |
| 2001/0024062 A1 | 9/2001 | Yoshino |
| 2002/0050739 A1 | 5/2002 | Koepff et al. |
| 2002/0117984 A1 | 8/2002 | Zuber et al. |
| 2003/0132039 A1 | 7/2003 | Gaffney et al. |
| 2003/0149521 A1 | 8/2003 | Minowa et al. |
| 2003/0169002 A1 | 9/2003 | Hughes |
| 2004/0090116 A1 | 5/2004 | Tsunehara |
| 2004/0239180 A1 | 12/2004 | Foust |
| 2004/0251095 A1 | 12/2004 | Simard et al. |
| 2005/0099146 A1 | 5/2005 | Nishikawa et al. |
| 2006/0047400 A1 | 3/2006 | Prakash et al. |
| 2006/0055240 A1 | 3/2006 | Toyota et al. |
| 2006/0089777 A1 | 4/2006 | Riddiford et al. |
| 2006/0102394 A1 | 5/2006 | Oliver |
| 2010/0025167 A1* | 2/2010 | Staub et al. ................... 188/156 |
| 2012/0317968 A1* | 12/2012 | Fudouji ............................ 60/468 |
| 2013/0057053 A1* | 3/2013 | Staub et al. ....................... 303/3 |

* cited by examiner

BRAKE COOLING FLUID DIVERTER FOR AN OFF-HIGHWAY MACHINE

CROSS-REFERENCE TO RELATED APPLICATION

This patent application is a continuation of and claims priority from U.S. Patent application Ser. No. 12/201,906, filed Aug. 29, 2008, the disclosure of which is herein incorporated by reference.

TECHNICAL FIELD

This patent disclosure relates generally to a brake cooling system and, more particularly, to brake cooling fluid systems and methods to control brake cooling fluid systems.

BACKGROUND

Braking systems are used in a large variety of machines and vehicles to control, slow and stop the machine. Exemplary machines include passenger vehicles, trains, dump trucks, and mining vehicles. Moreover, machines increasingly use electric drive systems to provide propulsion. For example, passenger vehicles may use a hybrid drive system whereby a traditional internal combustion engine and an electric motor are used to provide propulsion for the vehicle. Machines, such as a railway engines and off-road vehicles may use a diesel powered engine to drive a generator, which provides electric power to a motor. The motor then provides propulsion for the machine.

Braking systems may take advantage of components in electric drive systems to provide braking for machines. For example, a hybrid passenger vehicle may include a regenerative braking system whereby the vehicle is slowed by the electric drive system while at the same time a battery in the vehicle is recharged and railway engines may use dynamic retarding to slow the train. Although brake systems utilizing electric drive systems have been used, these systems cannot stop a machine traveling at high speed quickly, nor can these systems consistently slow a heavily loaded machine traveling downhill or in slippery conditions.

Some prior systems include a manual retarder lever that enables the operator to control ground speed by manually selecting the level of retarding or automatic retarder control that automatically controls machine speed based upon the operator's machine speed setting. The manual or automatic retarder may control an electric retarding system. Additionally, the operator may control a traditional braking pedal to actuate hydraulic brakes. In this way, the operator can manually control both dynamic retarding and hydraulic brakes. Nevertheless, this configuration may be difficult for an operator to control effectively. For example, if the speed setting lever is set to high, the operator may have to rely more on the service brakes. In a large, heavily loaded machine, this may lead to the service brakes overheating. In addition, excess service brake wear may occur on a machine if the service brakes are used for continuous retarding.

One exemplary braking system is described in U.S. Pat. No. 6,441,573 to Zuber et al. This system describes an electrical and friction braking system. However, the system does not vary the ratio of braking torques based upon user controls, nor based upon whether the electric braking system is meeting the requested retarding needs of the machine.

Some prior systems use brake cooling oil to reduce the risk of the service brakes overheating. Cooling oil may be pumped to the service brakes when they are activated and to minimize the likelihood that the service brakes will overheat. One exemplary brake cooling system is described in U.S. Pat. No. 4,083,469 to Schexnayder and assigned to Caterpillar Inc. The described system includes disc brake assemblies. The assemblies include valves for cooling fluid to communicate with a brake assembly. Cooling flow is automatically activated upon a high temperature condition in the brakes. While the described system will advantageously cool the brakes, it does not direct additional cooling oil flow to brake assemblies based on their actual or expected use in the system.

The foregoing background discussion is intended solely to aid the reader. It is not intended to limit the disclosure, and thus should not be taken to indicate that any particular element of a prior system is unsuitable for use within the disclosure, nor is it intended to indicate that any element, including solving the motivating problem, is essential in implementing the systems and methods described herein. The implementations and application of the systems and methods described herein are defined by the appended claims.

SUMMARY

The disclosure describes, in one aspect, a method of cooling a first friction brake system and a second friction brake system in a machine having a brake cooling system. The brake cooling system includes a brake cooling fluid and a brake cooling fluid diverter. The method determines whether the first friction brake system is activated. The method determines whether the second friction brake system is activated. Brake cooling fluid is circulated through the brake cooling system to the first friction brake system and to the second friction brake system. The brake cooling fluid is diverted to the first friction brake system and the second friction brake system based on the use of the first friction brake system and the second friction brake system.

In another aspect, the disclosure describes friction brake cooling system for a machine. At least one pump connects to at least one reservoir containing cooling fluid and is configured to provide a cooling fluid flow. At least one valve is in fluid communication with the pump. A first friction brake system is in fluid communication with the valve and a second friction brake system is in fluid communication with the valve such that cooling fluid from the reservoir is pumped through the valve to the first friction brake system and to the second friction brake system. Further, at least one controller is configured to divert the cooling fluid flow through the valve to the first friction brake system and to the second friction brake system based on the use of the first friction brake system and the use of the second friction brake system.

In another aspect, the disclosure describes an off-road work machine having an engine powering at least one pump in a first set of pumps and at least one pump in a second set of pumps. The machine further includes a first friction brake system associated with a front set of wheels and a second friction brake system associated with a rear set of wheels. A cooling fluid reservoir contains cooling fluid and is connected to the first set of pumps and the second set of pumps. A controller monitors the first friction brake system and the second friction brake system. The machine further includes a valve connecting the first set of pumps and the second set of pumps to the first friction brake system and the second friction brake system such that the valve can vary a cooling fluid flow to the first friction brake system and the second friction brake system in response to signals received from the controller.

BRIEF DESCRIPTION OF THE DRAWING(S)

DETAILED DESCRIPTION

Figure 1:
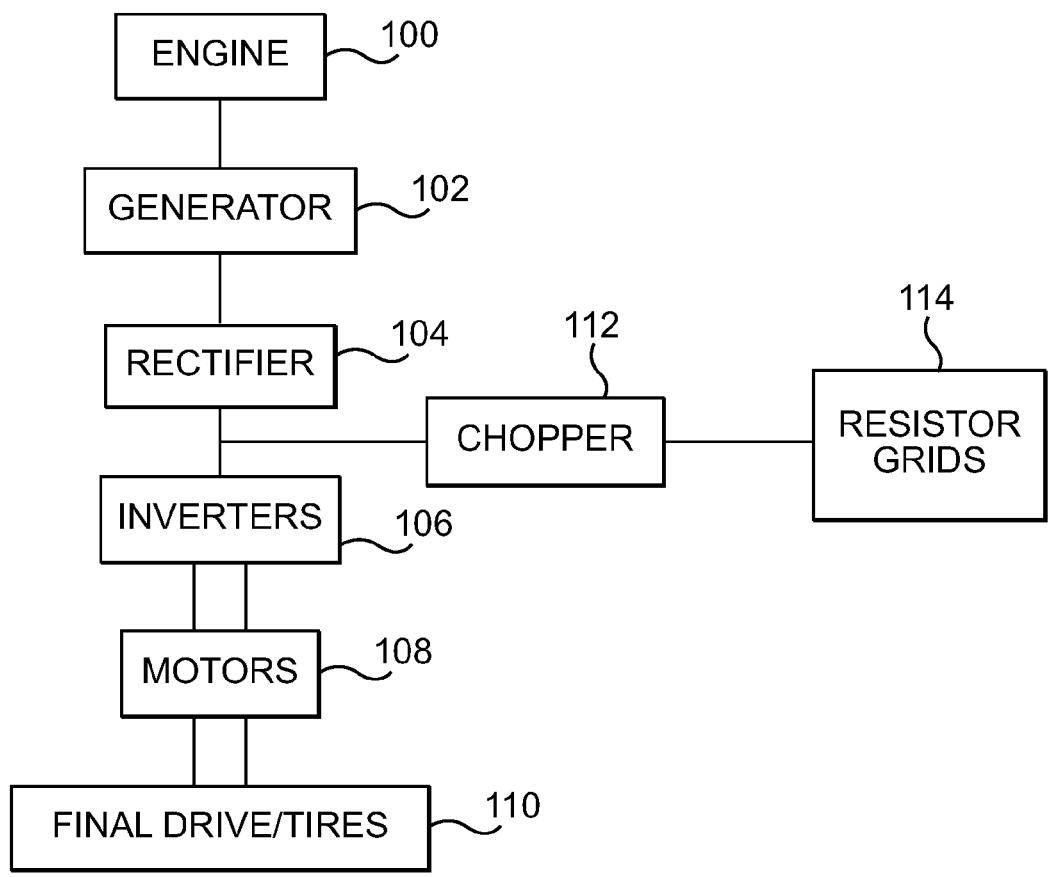
FIG. 1 is a schematic view of an electric drive system including an electric retarding system for a machine.

Referring now to the drawings, FIG. 1 illustrates a schematic view of an exemplary electric drive system including an electric retarding system for a machine. The exemplary electric drive system includes an engine 100. Suitable engines include gasoline powered and diesel powered internal combustion engines. When in a drive configuration, the engine 100 powers a generator 102. The generator 102 produces three-phase alternating current. The three-phase alternating current passes through a rectifier 104, which converts the alternating current to direct current. An inverter or invertors 106 convert the direct current to variable frequency back to alternating current which feeds a motor 108. By controlling the frequency of the current produced by the invertors 106, the speed of the motor 108 is controlled. The motor 108 produces torque which powers the drive wheels 110.

In an alternative embodiment, an engine is not needed and the motor 108 is driven directly from an electric power source, such as a battery. In some embodiments, one motor powers all drive wheels. In alternative embodiments, various numbers of motors are used to power drive wheels. For example, each drive wheel may have an individual motor associated with the wheel.

When operating in an electric braking, also known as electric retarding, configuration, the drive wheels 110 power the motor 108. Driving the motor 108 places a torque on the drive wheels 110 and causes them to slow, thus braking the machine. The motor 108 generates alternating current. The inverters 106 convert the alternating current to direct current and feed the current to a chopper 112, which acts as a direct current to direct current convert, and resistor grid 114. The power generated by the motors 108 is thus dissipated as heat by the resistor grid 114. However, in alternative embodiments, the power generated by the motors 108 may be stored for later use. In one embodiment, the power generated by the motors 108 is stored in an electric battery. The energy in the electric battery can then be used in drive mode to power the motors 108 and propel the machine.

As contemplated, the braking system operates in two modes. In a first mode, the electric retarder supplies as much of the requested braking torque as is possible. In a second mode, the electric retarder supplies only a ratio of the requested braking torque. For example, 2/3 of the braking torque may be supplied by the electric retarder and 1/3 may be supplied by the friction brake system. This configuration improves handling by spreading the retarding torque according to the weight on each axle.

Figure 2:
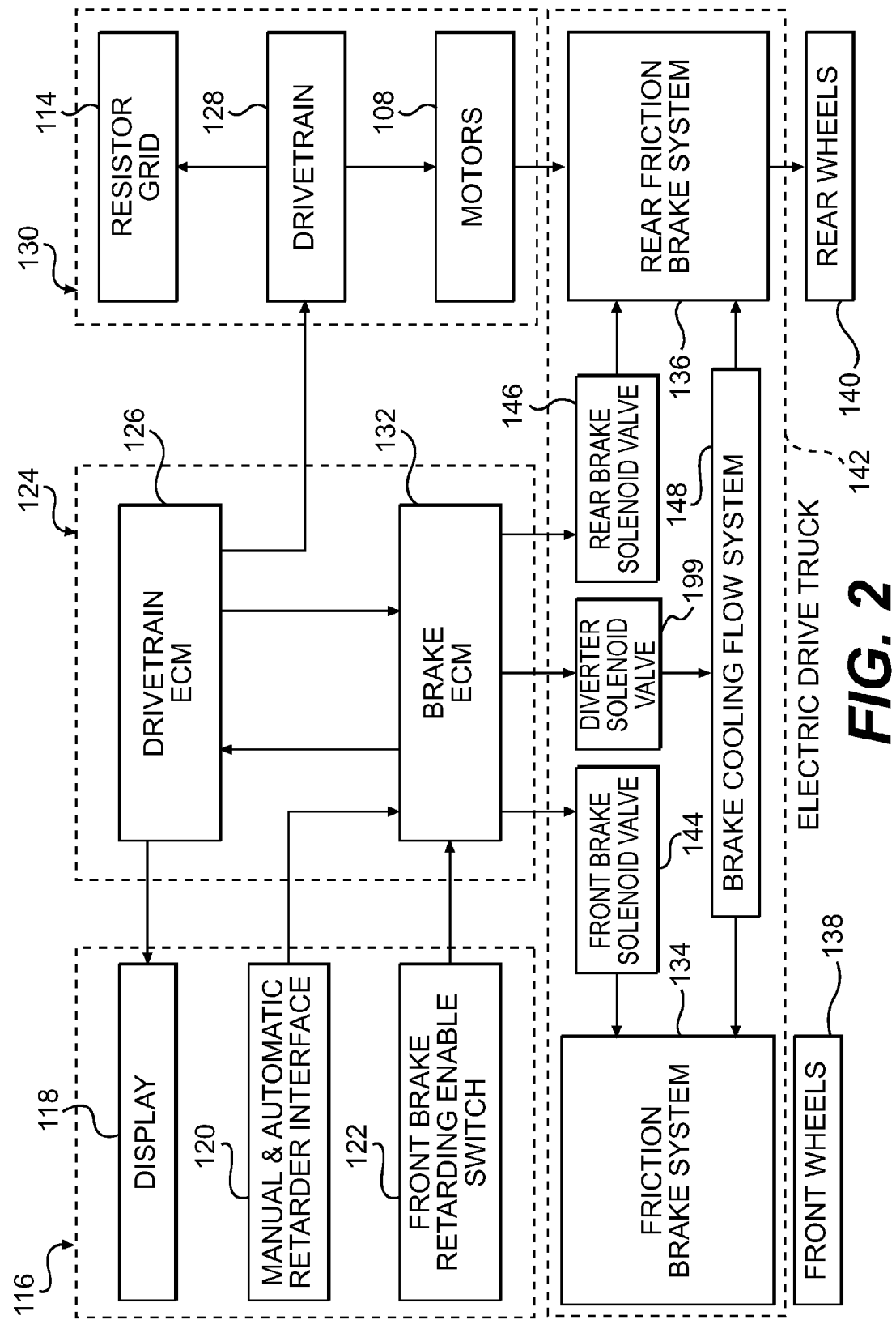
FIG. 2 is a logical block diagram illustrating a braking system for a machine including hydraulic friction brakes, a brake oil cooling system and an electric retarder.

Turning to FIG. 2, a logical block diagram illustrating a braking system for a machine including hydraulic friction brakes, an oil cooling system and an electric retarder is provided. In some embodiments, a user interface 116 allows the operator of the machine to view status information relating to the braking system on a display 118. Displayed information may include whether the capacity of the electric retarding system to supply additional braking torque has been exceeded. Additionally, status information regarding whether a front brake enable selection is set, and automatic retarding settings and manual retarding settings may be shown on the display 118. The front brake enable selection allows the operator to engage the front friction brakes. This may be done to assist machine braking in slick, wet or steep conditions. The selection can be made using the front brake retarding enable switch 122, which will be more fully described below with reference to FIG. 3.

A manual retarder torque setting allows the operator to control the speed of the machine by setting the manual retarder torque. For example, the manual retarder torque setting may be a lever the operator controls to set a desired amount of retarding torque. The manual retarder torque control sets a desired retarding torque for the electric retarder. Additionally, an automatic retarder torque may be automatically set by the braking control system. For example, the machine may be programmed in advance, either by the operator or at the factory, to automatically prevent the ground speed of the machine from exceeding a threshold. In one embodiment, the operator may set the automatic retarder torque value at any time before or during machine operation. In this way, the operator can adjust the automatic retarder torque value as conditions warrant. If the automatic retarder torque and manual retarder torque are both set, the system will multiply the values to determine a desired machine retarding torque. In another embodiment, the system uses the greater of the automatic retarder torque and manual retard torque values. In some embodiments, the manual retarder cannot request more torque than can be provided by the electric retarding system. In one embedment, the desired machine retarding torque is the total desired retarding torque from the axles of all wheels on the machine. The automatic retarder (also used for overspeed protection) sets the desired machine retarding torque to control machine speed.

The user interface 116 includes a manual and automatic retarder interface 120. The user interface 116 interacts with a controller 124. The controller 124 may include one or more control modules. In the illustrated embodiment, two electronic control modules (ECM) are used to implement the controller 124. The drive-train ECM 126 controls elements in the drive-train 128. The drive-train 128 includes the engine 100, generator 102, rectifier 104, inverters 106, motor 108, and chopper 112. When braking the machine, the electric retarding system 130 includes the rectifier 104, inverters 106, motor 108, and chopper 112 and the resistor grid 114. In electric retarding mode, the drive-train ECM 126 commands the electric retarding system 130 to provide a requested desired machine retarding torque and a ratio of retarding torque splits between sets of wheels. Thus, the system drive-train ECM may command the machine to apply the proper ratio of torque splits between, for example, a set of front wheels and a set of rear wheels.

In one embodiment, the ratio of retarding torque splits is a ratio of braking torques between a front set of wheels and a rear set of wheels. This ratio may be based on the front brake retarding enable switch 122, the ratio will be more fully described with reference to FIG. 3 below. In some embodiments, the ratio of retarding torque splits between the front set of wheels and rear set of wheels is based on the relative weight acting on each set of wheels. For example, in a machine that is not loaded, the ratio may be 50/50, but in a loaded machine the ratio may be 1/3 braking torque to the front and 2/3 of the braking torque to the rear.

In one embodiment, the drive-train ECM 126 receives signals indicating the front brake retarding enable switch 122 status, the manual retarder torque setting and the automatic retarder torque setting from a brake ECM 132. Based on these signals, the drive-train ECM 126 calculates the desired machine retarding torque to be applied to the machine. The drive-train ECM 126 provides signals indicating the desired machine retarding torque and the requested electric retarding torque to the brake ECM 132. The brake ECM, based on these signals, determines whether the requested electric retarding torque is sufficient to provide the full desired machine retarding torque. If additional braking is necessary to meet the desired machine retarding torque, the brake ECM requests a ratio of additional braking torque from the front friction brake system 134 and the rear friction brake system 136. The front friction brake system 134 connects to a front set of wheels 138 and the rear friction brake system 136 connects to a rear set of wheels 140. In one embodiment the front friction brake system 134 and the rear friction brake system 136 are part of a hydraulic brake system 142. In this embodiment, the hydraulic brake system includes a front brake solenoid valve 144 for controlling the flow of hydraulic fluid to the front friction brake system 134. Likewise, a rear brake solenoid valve 146 controls the pressure of hydraulic fluid to the rear friction brake system 136.

In large, heavy machines, such as large haul trucks used in off-road applications such as mining, friction brakes may overheat during use. Friction brakes continue to warm as they are applied. If the friction brake system overheats, component life may be reduced. Therefore, in some embodiments a brake cooling system supplies brake cooling oil to cool the front friction brake system 134 and the rear friction brake system 136. Brake cooling oil flows to both front and rear friction brakes. While front brake retarding is not enabled, oil flow is split between front and rear brakes according to the brake requirements. While front brake retarding is enabled, the majority of the cooling oil flows to the front friction brakes. In one embodiment, the brake ECM 132 provides a signal to a diverter solenoid valve, which connects to the brake cooling flow system 148 (described in more detail with respect to FIG. 4). The brake ECM 132 and brake cooling flow system 148 can divert additional flow to either the front friction brake system 134 or the rear friction brake system 136. In one embodiment, the flow is based on the ratio of retarding toque splits between set of wheels. In an alternative embodiment, the brake cooling flow system 148 diverts the flow based on heat sensors in the front friction brake system 134 and the rear friction brake system 136.

Figure 3:
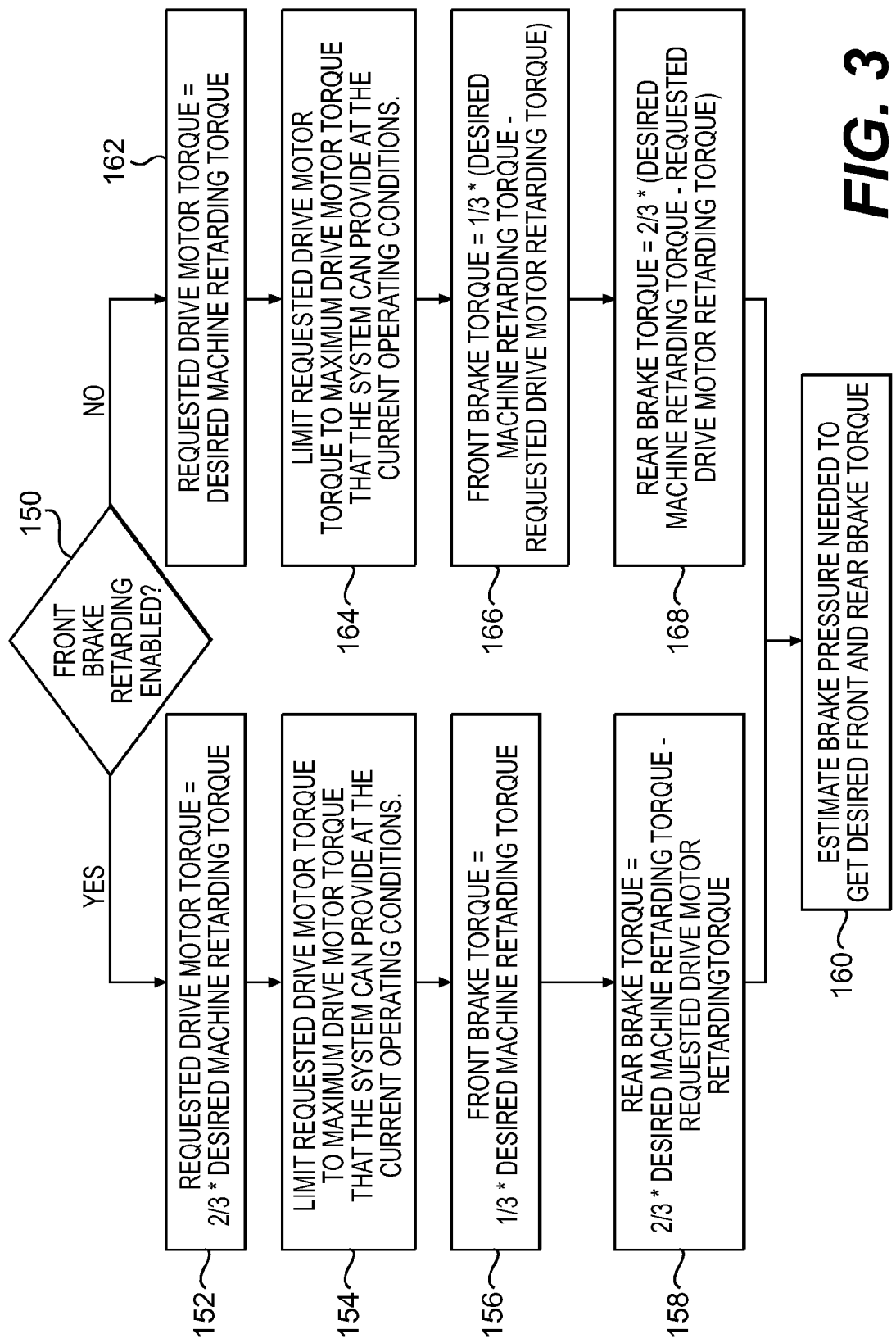
FIG. 3 is a flow chart illustrating one embodiment of a braking control process for a machine including hydraulic friction brakes and an electric retarder.

Turning now to FIG. 3, a flow chart illustrating one embodiment of a braking control process for a machine including hydraulic friction brakes and an electric retarder is shown. The illustrated embodiment shows the control process for a machine, such as an off-highway haul truck having a set of two front wheels disposed on opposite sides of the truck and a set of four rear wheels, with two wheels disposed on each side of the truck. At decision point 150 the system first determines whether the front brake retarding enable switch 122 is enabled. If the front brake retarding enable switch 122 is enabled, at step 152, the system commands the electric retarding system 130 to supply 2/3 of the desired machine retarding torque. The system requests 2/3 of the desired machine retarding torque from the electric retarding system 130 because, in this embodiment, the electric retarding system is associated with the rear wheels. More braking force can be applied to the rear wheels because there are four rear wheels as opposed to the two at the front of the machine.

At step 154, the system limits the requested torque from the electric retarding system 130 to the maximum torque that can be provided by the electric retarding system 130. At current operating conditions, the available electric retarding torque depends on the RPM of the motors. This can be accomplished in a number of ways including pre-calculating the maximum torque that can be provided by the electric retarding system 130 or by receiving a feedback signal from the electric retarding system 130 indicative of whether the electric retarding system 130 is providing the requested retarding. In the illustrated embodiment, at step 156, the system requests the remaining 1/3 of the desired machine retarding torque from the front friction brake system 134.

The rear friction brake system 136 is set to 2/3 of the desired machine retarding torque minus the requested torque from the electric retarding system 130 at step 158. Therefore, if the electric retarding system 130 is providing all of the requested torque, then the rear friction brake system 136 is set to not provide any additional braking torque. Finally, at step 160, the front service brake solenoid current and the rear service brake solenoid current are determined based on the front service brake pressure and rear service brake pressure needed to provide the commanded front service brake torque and rear service brake torque.

If, at decision point 150, the front brake retarding enable switch 122 is disabled, then the system moves to step 162. At step 162, the system commands the electric retarding system 130 to supply all of the desired machine retarding torque. At step 164, the system limits the requested torque from the electric retarding system 130 to the maximum torque that can be provided by the electric retarding system 130. As discussed above, this can be accomplished in a number of ways including pre-calculating the maximum torque that can be provided by the electric retarding system 130 or by receiving a feedback signal from the electric retarding system 130 indicative of whether the electric retarding system 130 is providing the requested retarding.

In the illustrated embodiment, at step 166, the system requests 1/3 of the desired machine retarding torque minus 1/3 of the requested torque from the electric retarding system 130. Therefore, if the electric retarding system 130 is providing all of the requested torque, then the front friction brake system 134 is set so as not to provide any additional braking torque. At step 168, the rear friction brake system 136 is set to 2/3 of the desired machine retarding torque minus 2/3 of the requested torque from the electric retarding system 130. Therefore, the system maintains the braking ratio of 1/3 braking torque from the front friction brake system 134 and 2/3 of the braking ratio from the rear friction brake system 136 for any braking torque needed to supplement the electric retarding system 130 braking torque. The system next enters step 160 as described above.

In one embodiment, the system monitors the temperature of the front and rear brakes using temperature sensors in the front friction brake system 134 and the rear friction brake system 136. Based on the measured temperatures, the braking control process can request additional cooling flow from a brake oil diverter control process described in FIG. 5. In another embodiment, the system may predict the temperature and cooling flow needed.

Figure 4:
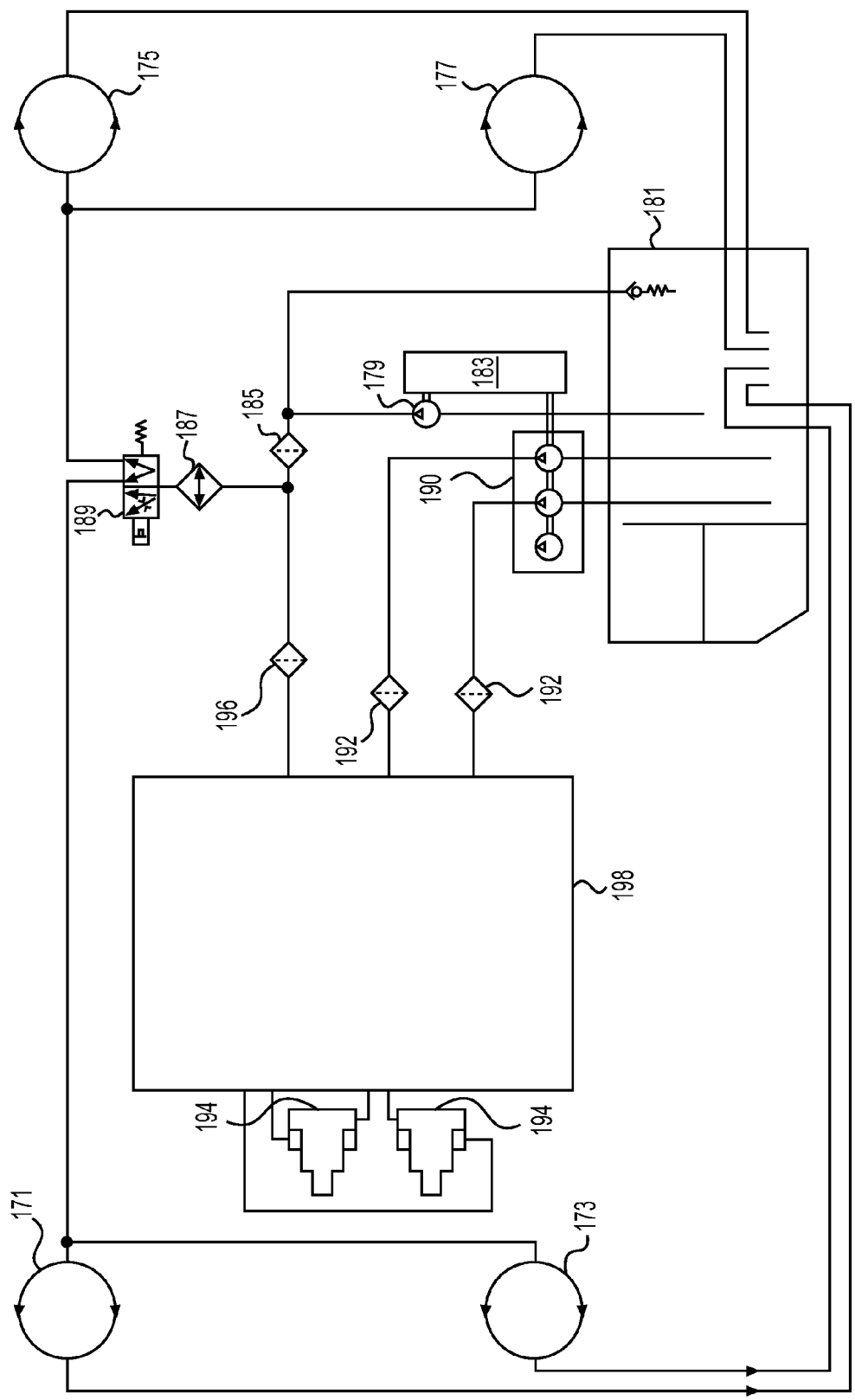
FIG. 4 is a logical block diagram illustrating one embodiment of a brake cooling flow system for a machine including friction brakes.

Turning now to FIG. 4, a logical block diagram illustrating one embodiment of a brake cooling system for a machine including friction brakes is shown. The illustrated embodiment shows four wheels, left front wheel 171, right front wheel 173, left rear wheel 175 and right rear wheel 177. However, other embodiments may include additional wheels. For example, in one embodiment a machine has two front wheels and four rear wheels with two wheels deposed on each side of the machine. A brake cooling pump 179 connects to a cooling oil reservoir 181 containing cooling oil. In an alternative embodiment multiple brake cooling pumps are utilized. In one embodiment the cooling oil is also the hydraulic fluid used throughout the machine in hydraulic systems such as hoists. In the illustrated embodiment, the brake cooling pump is powered by an engine 183. The brake cooling pump 179 pumps cooling oil from the cooling oil reservoir through a filter 185 to a cooler 187. The cooler may be a hydraulic cooler. After leaving the cooler 187, the cooling oil enters a diverter valve 189. The diverter valve 189 is controlled by a controller, such as the brake ECM 132 (FIG. 2). The diverter valve can transmit cooling oil to the left front wheel 171, right front wheel 173, left rear wheel 175 and right rear wheel 177.

In one embodiment the diverter valve 189 sends 60% of the cooling oil flow to the rear wheels 140 and 40% of the cooling oil flow to the front wheels 138 when both the front friction brake system 134 and the rear friction brake system 136 are activated. When the front friction brake system 134 is activated, but the rear friction brake system 136 is not activated, the diverter valve 189 sends 90% of the cooling oil flow to the front friction brake system 134 and 10% to the rear friction brake system 136. Other embodiments of the invention send different amounts of flow to the front friction brake system 134 and the rear friction brake system 136 under various conditions. As shown in FIG. 2, in one embodiment, the brake ECM controls the brake cooling flow system 148 including the diverter valve 189. An exemplary scheme for controlling the diverter valve 189 is described below with respect to FIG. 5.

In one embodiment, additional pumps, such as hoist pumps 190 provide additional cooling oil flow. In this embodiment, the engine 183 powers both the hoist pumps 190 and the brake cooling pump 179. The hoist pumps 190 provide hydraulic fluid flow to hydraulic systems on the machine, such as to screens 192 and other hydraulic components 198 and hydraulic actuators 194. In this embodiment, the cooling oil is also hydraulic fluid and stored in reservoir 181. In alternative embodiments, the cooling oil is distinct from the hydraulic fluid. After leaving the hydraulic actuators 194, the fluid passes through a filter 196 and is combined with the cooling oil flow from the brake cooling pump 179 in a combiner circuit (not illustrated). In the illustrated embodiment, the combiner circuit is located before the cooler 187 and the diverter valve 189. Therefore, the combined flow goes through the cooler 187 and the diverter valve 189 before flowing to the left front wheel 171, right front wheel 173, left rear wheel 175 and right rear wheel 177. In alternative embodiments, the combiner circuit is located after the diverter valve 189 and provides additional flow to either the left front wheel 171 and right front wheel 173 or left rear wheel 175 and right rear wheel 177. In this embodiment, a second cooler may cool the flow either before or after the combiner circuit.

Figure 5:
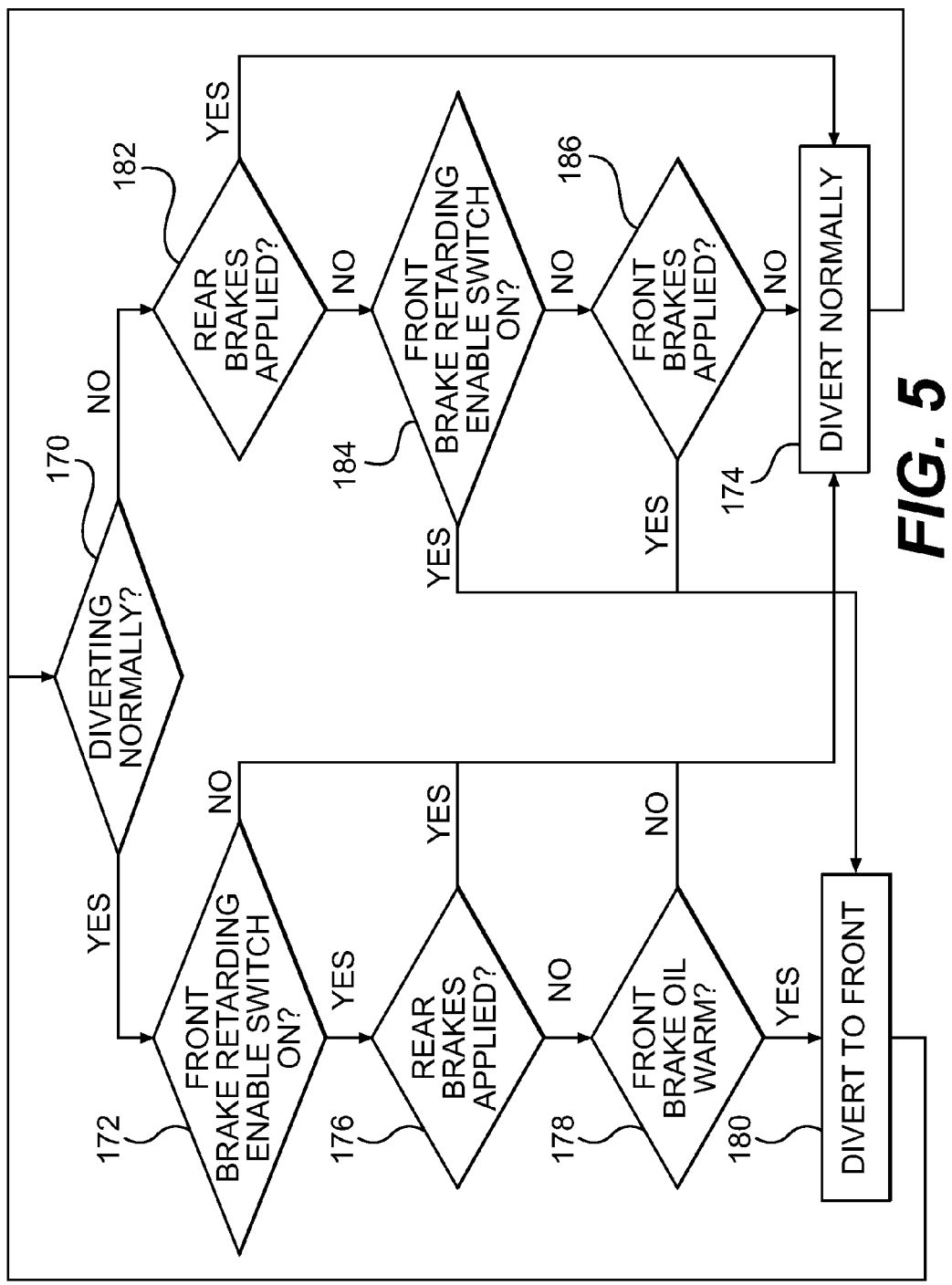
FIG. 5 is a flow chart illustrating one embodiment of a brake oil cooling diverter control process for a machine.

Turing now to FIG. 5, a flow chart illustrating one embodiment of a brake oil diverter control process for a machine is shown. At decision point 170, the system determines its current state. The states include (1) divert to front and (2) divert normally. When the front friction brake system 134 is used, the system state is divert to front; when the front friction brake system 134 is not used, the system state is divert normally. In the divert normally state, the majority of brake cooling oil is diverted to the rear friction brake system 136 because the front friction brake system 134 is only used to supplement the electric retarding system 130 and therefore does not need additional cooling. In one embodiment, in the divert normally state, sixty percent of the brake cooling flow is diverted to the rear friction brake system 136 and forty percent of the flow is diverted to the front friction brake system 134. In the divert to front state, ten percent of the brake cooling flow is diverted to the rear friction brake system 136 and ninety percent of the flow is diverted to the front friction brake system 134. In other embodiments, the system senses the heat in the braking systems and automatically adjusts flow as needed to cool the braking systems. At startup, the system can default to either state.

If, at decision point 170 the system is in the divert normally state, the system enters decision point 172. At decision point 172, the system determines whether the front brake retarding enable switch 122 is on. If the switch is not on, the system goes to block 174 and enters the divert normal state. From block 174, the system returns to the initial decision point 170. If the front brake retarding enable switch 122 is on, the system enters decision point 176. At decision point 176, the system determines whether the rear friction brake system 136 is activated. If the rear friction brake system 136 is activated, the system enters step 174 and diverts the cooling flow normally. In one embodiment, at decision point 176, the system determines whether the rear brakes have been used within some period of time, such as five seconds. If the rear friction brake system 176 have not been applied, the system enters decision point 178 and determines whether the front friction brake system 134 cooling oil reaches a threshold. If the oil does not reach the threshold, the system enters step 174 and diverts the cooling oil normally. If, at step 178 front friction brake system 134 cooling oil is warm, the system enters step 180 and diverts additional cooling oil flow to the front friction brake system 134. The system then returns to decision point 170.

If, at decision point 170 the last state was not diverting normally, the system enters decision point 182. At decision point 182, the system determines whether the rear friction brake system 136 is activated. If the rear friction brake system 136 is activated, the system enters step 174 and diverts the cooling flow normally. In one embodiment, at decision point 182, the system determines whether the rear brakes had been used within some period of time. If the rear friction brake system 136 is not activated, the system enters decision point 184. At decision point 184, the system determines whether the front brake retarding enable switch 122 is on. If the front brake retarding enable switch 122 is on, the system goes to step 180 and diverts the cooling flow to the front. If the front brake retarding enable switch 122 is off, the system goes to decision point 186. At decision point 186, the system determines whether the front friction brake system 134 is activated. If the front friction brake system 134 is activated, the system enters step 180 and diverts flow to the front friction brake system 134. If the front friction brake system 134 is not activated, the system enters step 174 and diverts the cooling flow normally. In some embodiments, at decision point 186, the system determines whether the front friction brake system 134 has been applied within some period of time, such as 2 seconds.

Industrial Applicability

The industrial applicably of the methods and systems for braking machines described herein will be readily appreciated from the foregoing discussion. The present disclosure is applicable to many machines and many environments. One exemplary machine suited to the disclosure is a large off-highway truck, such as a dump truck. Exemplary off-highway trucks are commonly used in mines, construction sites and quarries. The off-highway trucks may have payload capabilities of 100 tons or more and travel at speeds of 40 miles per hour or more when fully loaded. The trucks operate in a variety of environments and must be able to negotiate steep inclines in wet conditions.

These large off-highway trucks must be able to slow and stop even when traveling down steep, wet slopes. Using the described methods and systems, trucks can be slowed by using the electric retarding system 130 or the electric retarding system 130 in combination with the front friction brake system 134, the rear friction brake system 136, or both. In some embodiments, the trucks are slowed using the electric retarding system 130 to save wear and tear on the front friction brake system 134 and the rear friction brake system 136. However, in wet conditions, the truck operator can manually engage the front friction brake system 134 to aid machine handling. Additionally, the system can automatically use the front friction brake system 134 and the rear friction brake system 136 to aid in braking when electric retarding capacity is exceeded. When the front friction brake system 134 and the rear friction brake system 136 are in use, the system can automatically vary the cooling flow to the systems using the brake cooling flow system 148.

Similarly, the methods and systems described above can be adapted to a large variety of machines and tasks. For example, backhoe loaders, compactors, feller bunchers, forest machines, industrial loaders, skid steer loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of cooling a first friction brake system and a second friction brake system in a machine having a brake cooling system including fluid and a fluid diverter, the method comprising:
    determining whether the first friction brake system is activated;
    determining whether the second friction brake system is activated;
    circulating, with a first set of pumps including at least one pump, fluid through the brake cooling system to the first friction brake system and the second friction brake system;
    circulating, with a second set of pumps including at least one pump, fluid through at least one hydraulic system;
    combining the flow of fluid from the first set of pumps and the flow of fluid from the second set of pumps; and
    diverting fluid between the first friction brake system and the second friction brake system based on a first brake enable switch for the activation of the first friction brake system and based on a second brake enable switch for the activation of the second friction brake system.

2. The method of claim 1 further comprising the step of delaying the diversion of the fluid until the fluid reaches a predetermined temperature.

3. The method of claim 1 wherein the step of determining whether the first friction brake system is activated includes monitoring a manual retarder torque setting and an automatic retarder torque setting.

4. The method of claim 1 wherein the step of determining whether the second friction brake system is activated further includes monitoring a manual retarder torque setting and an automatic retarder torque setting.

5. The method of claim 1 further including the step of diverting 40% of the fluid to the first friction brake system when both the first friction brake system and the second friction brake system are activated.

6. The method of claim 1 further including the step of diverting 90% of the fluid to the first friction brake system when the first friction brake system is activated and the second friction brake system is not activated.

7. A friction brake cooling system comprising:
    at least one first pump in a first set of pumps connected to at least one reservoir containing fluid and configured to provide a fluid flow to at least one valve in fluid communication with the first pump;
    at least one second pump in a second set of pumps connected to the reservoir and configured to provide fluid to at least one hydraulic system and configured to provide fluid flow to the valve in fluid communication with the first pump and the second pump;
    a first friction brake system in fluid communication with the valve and a second friction brake system in fluid communication with the valve such that cooling fluid from the reservoir is pumped through the valve to the first friction brake system and to the second friction brake system;
    at least one controller configured to divert the cooling fluid flow through the valve to the first friction brake system and to the second friction brake system based, on a first brake enable switch for the activation of the first friction brake system and a second brake enable switch for the activation of the second friction brake system.

8. The friction brake cooling system of claim 7 wherein the first pump is dedicated to the friction brake cooling system.

9. The friction brake cooling system of claim 8 wherein a flow of the fluid from at least one third pump is directed to the valve.

10. The friction brake cooling system of claim 9 wherein the fluid is separate from hydraulic fluid used for at least one hydraulic system associated with the machine.

11. The friction brake cooling system of claim 7 wherein the fluid is hydraulic fluid used for at least one hydraulic system associated with the machine.

12. The friction brake cooling system of claim 7 wherein the valve diverts 90% of the flow to the first friction brake system when the second friction brake system is not activated and is configured to divert 40% of the flow to the first friction brake system when the second friction brake system is activated.

* * * * *